United States Patent [19]

Hsieh

[11] 4,237,246
[45] Dec. 2, 1980

[54] COPOLYMERS OF 1,3-CYCLODIENES, MONOVINYLAROMATIC COMPOUNDS AND POLYVINYLAROMATIC HYDROCARBONS

[75] Inventor: Henry L. Hsieh, Bartlesville, Okla.

[73] Assignee: Phillips Petroleum Company, Bartlesville, Okla.

[21] Appl. No.: 705,481

[22] Filed: Jul. 15, 1976

Related U.S. Application Data

[63] Continuation-in-part of Ser. No. 438,244, Jan. 31, 1974, abandoned.

[51] Int. Cl.$^3$ ............................ C08F 4/48; C08F 2/06; C08F 8/04; C08F 32/04
[52] U.S. Cl. .................................. 525/332; 525/339; 526/173; 526/180; 526/181; 526/308
[58] Field of Search ................... 526/25, 26, 173, 180, 526/308, 181; 525/332, 339

[56] References Cited

U.S. PATENT DOCUMENTS

| | | | |
|---|---|---|---|
| 3,239,495 | 3/1966 | Small | 526/308 |
| 3,280,084 | 10/1966 | Zelinski | 526/173 |
| 3,644,322 | 2/1972 | Farrar | 526/173 |
| 3,852,252 | 12/1974 | De Vault | 526/26 |

FOREIGN PATENT DOCUMENTS

198393  9/1967  U.S.S.R. .................................. 526/308

OTHER PUBLICATIONS

Schildknecht C., Viny and Related Polymerization, Wiley & Sons (NY), pp. 68, 69 (1952).

*Primary Examiner*—Henderson, C. A.

[57] ABSTRACT

A 1,3-cyclodiene-monovinylaromatic copolymer is produced by polymerizing a monomer mixture comprising a 1,3-cyclodiene, a monovinylaromatic compound and a polyvinylaromatic hydrocarbon in the presence of an organolithium initiator.

20 Claims, No Drawings

COPOLYMERS OF 1,3-CYCLODIENES, MONOVINYLAROMATIC COMPOUNDS AND POLYVINYLAROMATIC HYDROCARBONS

This application is a continuation-in-part of copending application Ser. No. 438,244, filed Jan. 31, 1974, now abandoned.

BACKGROUND

The invention relates to certain copolymers and a method for their production.

Copolymers produced by polymerizing 1,3-cyclodienes and monovinylaromatic compounds, such as for example 1,3-cyclohexadiene-styrene copolymers, are relatively new polymers. These polymers are thermoplastic in nature and are suitable for use as combs, toys, kitchen utensils, refrigerator parts, automobile parts and various other articles of manufacture. In addition, the high clarity of these polymers in molded form makes possible their use in container or even optical applications. Also, these copolymers with high 1,3-cyclodiene content possess softening points such that containers and other similar objects molded from such copolymers possess sufficient high temperature stability to permit hot water sterilization practice. In view of the large variety of potential uses for such copolymers, it is desirable to improve the strength of the copolymers and thus the durability of the products made therefrom.

It is an object of the invention to produce polymers. It is a further object of the invention to produce 1,3-cyclodiene-monovinylaromatic copolymers. Another object of the invention is to produce 1,3-cyclodiene-monovinylaromatic copolymers with improved properties. Other objects, aspects and advantages of the present invention will be apparent to those skilled in the art by studying the specification and appended claims.

SUMMARY

According to the invention, a 1,3-cyclodiene-monovinylaromatic copolymer is produced by polymerizing a monomer mixture comprising a 1,3-cyclodiene, a monovinylaromatic compound and a polyvinylaromatic hydrocarbon in the presence of an organolithium initiator.

Further according to the invention, a novel 1,3-cyclodiene-monovinylaromatic copolymer is provided comprising units of a 1,3-cyclodiene, units of a monovinylaromatic compound, and units of a polyvinylaromatic hydrocarbon wherein the amount of the polyvinylaromatic hydrocarbon incorporated in the copolymer is in the range of from about 0.02 to 2 parts by weight per 100 parts by weight monomer.

DETAILED DESCRIPTION OF THE INVENTION

It has been discovered that by the incorporation of a polyvinylaromatic hydrocarbon as a comonomer in an otherwise 1,3-cyclodiene/monovinylaromatic copolymer a substantial increase in tensile strength is achieved without curing, crosslinking or vulcanizing. The copolymers of the present invention are not cured, crosslinked or vulcanized because no gel content has been detected in said copolymer. The fact that the copolymers of the present invention have no detectable gel content is completely unexpected because the presence of a polyvinylaromatic hydrocarbon in a polymerization mixture is normally expected to cause some curing, crosslinking or vulcanizing of the resultant copolymer which is indicated by the detection of gel in the copolymer.

1,3-Cyclodienes suitable for use in the practice of the present invention are represented by the general formula

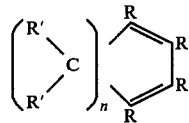

wherein n can be 1 or 2 and R can be a hydrogen, methyl or ethyl radical. The R groups can be the same or different. R' can be a hydrogen, straight or branched chain alkyl, cycloalkyl or aryl radical such tht the maximum number of carbon atoms per R' group is about 6. The R' groups can be the same or different. The total number of carbon atoms in the 1,3-cyclodiene molecule can range from 5 to about 20. Examples of such compounds include 1,3-cyclopentadiene, 2-methyl-1,3-cyclopentadiene, 5-ethyl-1,3-cyclopentadiene, 1,3-cyclohexadiene, 1-ethyl-1,3-cyclohexadiene, 1,4-dimethyl-5-isorpopyl-1,3-cyclohexadiene, 2,3-dimethyl-5,6-diphenyl-1,3-cyclohexadiene, 2,3-diethyl-5-(n-butyl)-6-phenyl-1,3-cyclohexadiene and 1-methyl-5-cyclohexyl-1,3-cyclohexadiene.

Monovinylaromatic compounds suitable for use in the practice of the invention include compounds ranging from about 8 to 14 carbon atoms per molecule, such as for example styrene, various alkylstyrenes such as 4-ethylstyrene, halostyrenes such as 2,3-dichlorostyrene and 1-vinylnaphthalene. It is within the scope of the invention to employ mixtures of the various monovinylaromatic compounds and/or 1,3-cyclodienes described above.

Polyvinylaromatic hydrocarbons which are used in the practice of the invention are represented by the general formulas:

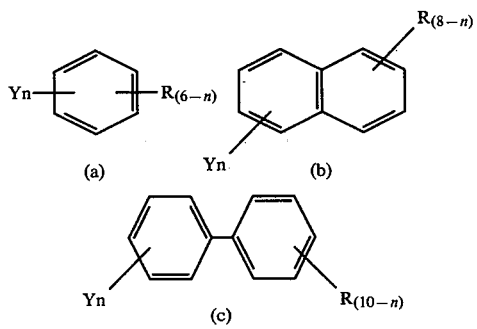

wherein Y is a vinyl group, each R is hydrogen or a lower alkyl with the total of the alkyl substituents containing not more than 12 carbon atoms, and n is 2 or 3. By lower alkyl is meant alkyl groups containing from 1 to 4 carbon atoms. The substituents in the above formulas (b) and (c) can be on either or both rings. Examples of suitable polyvinylaromatic hydrocarbons include divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, 1,2-divinyl-3,4-dimethylbenzene, 1,5,6-trivinyl-3,7-diethylnaphthalene, 1,3-divinyl-4,5,8-tributylnaphthalene and 2,2'-divinyl-4-ethyl-4'-propylbiphenyl. The divinylaromatic hydrocarbons containing up to 26 carbon atoms are preferred, particularly divinylbenzene in any of its isomeric forms. Commercial divinylbenzene which is a mixture of isomers is also suitable.

The weight ratio of 1,3-cyclodiene units to units of the monovinylaromatic compound in the copolymer varies broadly. Generally the weight ratio is from about 1:99 to 99:1, preferably from about 20:80 to 80:20. However, the choice of ratio is governed by the polymer properties desired, that is, increasing the cyclodiene content raises the softening temperature of the polymer. The amount of polyvinylaromatic hydrocarbon incorporated in the copolymer varies from about 0.02 to 2, preferably 0.05 to 1.0 parts by weight per hundred parts by weight of the 1,3-cyclodiene and monovinylaromatic monomers. As used herein, the word monomer in the expression parts by weight per 100 parts by weight monomer (phm) means only the 1,3-cyclodiene and monovinylaromatic monomers and not the polyvinylaromatic monomer, unless otherwise indicated.

Organolithium compounds suitable for use in the polymerization have the formula $RLi_x$, wherein R is a hydrocarbon radical selected from the group consisting of aliphatic, cycloaliphatic and aromatic radicals and x is an integer of 1 to 4, inclusive. The R in the formula has a valence equal to the integer and preferably contains from 1 to 20, inclusive, carbon atoms, although higher molecular weight compounds can be utilized. Examples of suitable organolithium compounds include methyllithium, isopropyllithium, butyllithium, t-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio3-decene, 1,4-dilithiobenzene, 1,5-dilithionaphthalene, 1,2-dilithio-1,2-diphenyl ethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-trilithiodecane, 1,5,10,20-tetralithioeicosane, 1,2,3,5-tetralithiocyclohexane, and 1,2,3,5-tetralithio-4-hexylanthracene.

The quantity of organolithium initiator employed depends upon the desired molecular weight of the polymer, since increasing the amount of initiator decreases the molecular weight of the polymer. The amount of initiator can vary widely, but generally it is in the range of about 0.1 to 100 millimoles per 100 grams of monomer.

The 1,3-cyclodiene, monovinylaromatic compound, and the polyvinylaromatic hydrocarbon can all be charged prior to initiation of polymerization or the polyvinylaromatic hydrocarbon can be charged after polymerization of the other monomers has begun. Alternatively, all of the polyvinylaromatic hydrocarbon can be present at the start of polymerization with only a portion of the other monomers wherein the remainder of the latter is added as polymerization proceeds. Any other mode of addition of the 1,3-cyclodiene, monovinylaromatic compound and polyvinylaromatic hydrocarbon singly or in combination prior to inactivation of the initiator is included within the scope of this invention.

The copolymerization process of this invention is usually carried out in the presence of a diluent. Diluents suitable for use in the process are hydrocarbons which are not detrimental to the polymerization. Suitable diluents include paraffinic, cycloparaffinic and aromatic hydrocarbons and mixtures thereof. Suitable diluents include, for example, hydrocarbons such as n-heptane, 2,2,4-trimethylpentane, cyclohexane, benzene, toluene and the xylenes. Usually the best results are obtained using cycloparaffinic hydrocarbons and thus they are preferred.

The inclusion of ethers, with the diluent, of 0.01–50, preferably 1–10 parts by weight per hundred parts of monomer (phm) is desirable in order to increase the polymerization rate and to increase the degree of conversion. Suitable ethers include, for example, tetrahydrofuran, dioxane, dimethyl ether, diethyl ether, di-n-butyl ether, ethyl n-butyl ether, anisole and diphenyl ether. In lieu of ethers tertiary amines can be used to increase the polymerization rate. The inclusion of from about 0.01–50, preferably 0.1 to 10 phm tertiary amines along with the diluent is desirable. Suitable tertiary amines include triethylamine, tri-n-propylamine, N,N-dimethylaniline and N,N,N',N'-tetramethyl ethylenediamine.

The polymerization reaction can be carried out under autogenous pressure or at any suitable pressure sufficient to maintain the reaction mixture substantially in the liquid phase. The pressure will thus depend upon the particular diluent being employed and the temperature at which the polymerization is carried out. However, higher pressures can be employed if desired, these pressures being obtained by some such suitable method as the pressurization of the reactor with a gas which is inert with respect to the polymerization reaction.

The polymerization temperature can vary broadly from 0° to +300° F., but preferably will range from 30° to 150° F.

The time required for the polymerization will be dependent upon such factors as the molecular weight desired, quantity of catalyst employed, temperature, and the like, but generally will range from a few minutes to as much as 48 hours although longer polymerization periods can be employed.

The process can be carried out batchwise or as a continuous process. Various substances are known to be detrimental to the catalyst composition of this invention. These substances include carbon dioxide, oxygen and water. It is highly desirable, therefore, that the reactants be freed of these materials as well as any other materials which tend to inactivate the catalyst. Any of the known methods for removing such contaminants can be used. Also when a diluent is employed in the process, it is preferred that this material be substantially free of impurities such as water and oxygen. In this connection it is desirable to remove air and moisture from the reaction vessel in which the polymerization is conducted. Although it is preferable to carry out the polymerization under anhydrous or substantially anhydrous conditions, it is to be understood that small amounts of these catalyst-inactivating materials can be tolerated in the reaction mixture. However, it is also to be understood that the amount of such materials which can be tolerated in the reaction mixture is insufficient to cause complete deactivation of the catalyst.

At the completion of the polymerization reaction, the total reaction mixture is then treated to inactivate the catalyst and precipitate the rubbery product. Any suitable method can be utilized for carrying out this treatment of the reaction mixture. In one suitable method, the catalyst-inactivating agent, such as water or an alcohol, is added to the mixture so as to inactivate the catalyst and cause precipitation of the polymer. The polymer is then separated from the alcohol or water and diluent by any suitable means such as decantation or filtration. It is often preferred to add initially only an amount of the catalyst-inactivating agent which is sufficient to inactivate the catalyst without causing precipitation of the dissolved polymer. It has also been found to be advantageous to add an antioxidant, such as 2,6-di-t-butyl-4-methylphenol, to the polymer solution prior to precipitation of the polymer. After addition of the catalyst-inactivating agent and the antioxidant, the polymer present in the solution can then be separated by the addition of an excess of an agent such as ethyl alcohol or isopropyl alcohol. When an alcohol is used as a catalyst-inactivating agent, it also functions to precipitate the polymer. In the event other catalyst-inactivating agents are employed which do not perform this dual role, a suitable agent, such as an alcohol, can be added to precipitate the polymer. It is, of course, to be realized that it is within the scope of the invention to employ other suitable means to recover the polymer from solution. After separation from the solvent mixture and alcohol by filtration or other suitable means, the polymer is dried.

The copolymers described above can be hydrogenated by various methods well known in the art. The hydrogenated copolymers of the present invention generally have an increased softening temperature as compared to the corresponding unhydrogenated copolymer. The increase in softening temperature is conveniently measured as the Vicat softening point.

Normally, at least about 65 percent of the olefinic unsaturation of the inventive copolymer is removed by hydrogenation in order to achieve a substantial increase in softening point; however, it is understood that copolymers with any portion of the olefinic unsaturation hydrogenated are within the scope of the invention. Also, removal of the aromatic unsaturation of the copolymers of the present invention to any degree is within the scope of the present invention.

A number of hydrogenation processes are well known in the art which can be used in accordance with the present invention, and thus the present invention is not limited thereby. One such suitable process is described below.

An unsaturated copolymer as previously described and prepared in accordance with the invention is charged, in a condition substantially free of salts or other materials which might act as hydrogenation catalyst poisons, to a suitable hydrogenation reactor, said polymer being in the form of a solution or dispersion in a suitable solvent. In some instances the polymer dissolves completely, while in other instances a dispersion is formed. The solvent or dispersant is preferably inert to the hydrogenation reaction and to the other compounds present. Suitable solvents include saturated cyclic hydrocarbons such as cyclohexane, methylcyclohexane, decalin and the like. Aromatic hydrocarbons, such as benzene and toluene; cyclic ethers, such as dioxane; and paraffinic hydrocarbons such as isooctane, isoheptane, and normal heptane; hydroaromatic hydrocarbons such as tetralin; and the like, can also be used. Mixtures of solvents and/or dispersants can be employed if desired. The polymer concentration in the solvent or dispersant can vary over a relatively wide range, and can be as low as 1 weight percent although concentrations of about 5 to 25 weight percent are preferred.

In one embodiment, after the polymer has been dissolved in the solvent the hydrogenation catalyst is added, hydrogen is added, and the temperature raised to a suitable level for the desired degree of hydrogenation. This operation can be carried out in a batchwise or in a continuous manner.

One catalyst system which can be used employs two components, one being a reducing metal compound which can be represented by the formula $MR_n^{IV}$ wherein M represents a metal of Group I-A, II-A, or III-A of the Periodic System as shown on page B-2 of the "Handbook of Chemistry and Physics", 45th Edition, published by The Chemical Rubber Company in 1964, n is the valence of the metal M and each $R^{IV}$ is hydrogen or a hydrocarbyl radical having 1–20 carbon atoms such as alkyl, cycloalkyl, aryl or combinations thereof. Typical compounds representative of this component for the catalyst system include triisobutylaluminum, triethylaluminum, trieicosylaluminum, dicyclohexyl(phenyl)aluminum, 1-anthracenylpotassium, di-3-phenanthrylberyllium, n-butyllithium, dimethylmagnesium, di-n-propylbarium, tri-n-pentylgallium, diisobutylaluminum hydride, sodium hydride, aluminum hydride, and the like.

The second component of the catalyst system is a metal salt having the formula

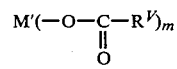

in which M' is a Group VIII metal of the above-referenced Periodic System; $R^V$ has the same meaning as for $R^{IV}$ in the formula for the first component; and m is the valence of M'. The second component is preferably a nickel salt. Typical compounds are nickel stearate, nickel acetate, nickel propionate, nickel formate, nickel octoate, nickel benzoate, nickel naphthenate, and the corresponding iron, cobalt, palladium, and platinum salts such as ferric stearate, cobalt naphthenate, cobalt octoate, and the like. Of this group nickel stearate, nickel octoate, and nickel naphthenate are the presently preferred compounds.

It is preferred to use the nickel salts of organic acids having 5–20 carbon atoms, preferably branched, because they are more readily soluble in the treating mixture. Lower molecular weight acid salts, however, such as nickel acetate can be used and one method of improving the physical form of such materials for use in the process is to grind the nickel acetate with mineral oil to form a very fine slurry prior to combining it with the reducing metal compound.

The hydrogenation catalysts are generally prepared by mixing the components in a solvent, for example, the hydrocarbon solvent to be used for the treating medium. Catalyst poisons such as oxygen, water or the like should be avoided. The ratio of the reducing metal component to the Group VIII metal compound varies widely. On a molar basis it is generally in the range of 0.1 to 10; however, good results are obtained employing a molar ratio in the range of about 0.5 to 5 moles per mole. The concentration of the catalyst in the reaction mixture can also vary widely; it is generally in the range of 0.001 to 10 weight percent based on the polymer; however, good results are obtained employing a concentration in the range of 0.002 to 5 weight percent.

Greater or lesser amounts of catalyst can, however, be used.

To hydrogenate at least a portion of the olefinic unsaturation, the polymer, generally in solution, is contacted with the hydrogenation catalyst under conditions which include temperatures in the range of about 10 to about 250° C. and pressures up to about 1000 psig. The reaction time can vary from 1 minute to about 25 hours or more. Good results are obtained employing temperatures in the range of about 75° to about 200° C., pressures in the range of about 10 to about 500 psig and reaction times in the range of about 10 minutes to about 10 hours. When treating the polymer in solution the pressure is usually that sufficient to maintain reaction mixture substantially in the liquid phase.

To hydrogenate at least a portion of the aromatic unsaturation in addition to the olefinic unsaturation the polymer, generally in solution, is contacted with the catalyst under conditions which include temperatures in the range of from about 10° to about 250° C., pressures up to about 3000 psig and reaction times in the range of from about 10 minutes to about 40 hours or more. Good results are obtained employing conditions which include temperatures in the range of from about 75° to about 200° C., pressures in the range of from about 100 to about 1500 psig, and reaction times in the range of from about 1 hour to about 20 hours.

In accordance with the invention, hydrogenated copolymers were produced with essentially all the olefinic unsaturation hydrogenated and simply by increasing the severity of the hydrogenation conditions the styrene nuclei in the polymer could have been hydrogenated. The hydrogenated copolymers show a substantial increase in their Vicat temperatures as compared to the unhydrogenated copolymers. Further, these hydrogenated copolymers have well-developed resinous characteristics.

Upon the effective completion of the hydrogenation reaction, the hydrogenated polymer can be isolated by simple, well-known techniques. For example, the catalyst components can be converted to water-soluble salts and washed from the polymer solution. The polymer solution can then be dried, and an antioxidant added if desired, and the polymer isolated by evaporation of the solvent.

The copolymers produced in accordance with the invention are thermoplastic and can be used for fabricating articles such as combs, toys, kitchen utensils, refrigerator parts, automobile parts and various other industrial and commercial items. In addition, the high clarity of the polymers in molded form makes possible the production of transparent containers and their use in optical applications. Also these copolymers containing a high 1,3-cyclodiene content possess softening points such that containers and other objects molded from such copolymers possess sufficient high temperature stability to permit hot water sterilization practice. The hydrogenated copolymers of the invention can be fabricated into clear plastic articles which will have a higher softening temperature compared to their unhydrogenated counterpart. The copolymers with the aromatic unsaturation hydrogenated can be subjected to service temperatures which are unusually high for plastic articles. In addition the hydrogenated and unhydrogenated copolymers can be compounded with stabilizers, antioxidants, fillers, pigments, reinforcing agents and other such additives as may be required.

EXAMPLES

The following polymerization runs were carried out under nitrogen in capped beverage bottles employing anhydrous reactants and conditions, 1,3-Cyclohexadiene, styrene, and divinylbenzene were employed as the 1,3-cyclodiene monovinylaromatic compound, and polyvinylaromatic hydrocarbon respectively. The charge order was: diluent, monomers including polyvinylaromatic hydrocarbon, ether, and initiator unless otherwise indicated. The bottles were tumbled in a constant temperature bath for the stipulated polymerization times and at the stipulated temperatures. Following polymerization, 2,6-di-t-butyl-4-methylphenol (one part by weight per hundred of total monomer including divinylaromatic hydrocarbon) was added in a 50/50 volume toluene/isopropyl alcohol solution, the polymer solutions were filtered, and the polymers were coagulated by adding the filtrates to isopropyl alcohol. The polymers were then collected by filtration and dried under reduced pressure.

Runs 1 to 7

The runs were made in accordance with the following recipe wherein progressively more divinylbenzene was employed with a 60/40 styrene/1,3-cyclohexadiene mixture. Also, two additional runs were made at a higher initiator level. The results are tabulated below.

| Recipe | phm[1] |
|---|---|
| Cyclohexane | 585 |
| Styrene | 60 |
| 1,3-Cyclohexadiene | 40 |
| Tetrahydrofuran | 2 |
| Divinylbenzene[2] | variable |
| n-Butyllithium (1.78 molar in cyclohexane) | variable |
| Temperature, °F. | 86 |
| Time, hrs. | 16 |

[1] phm: parts by weight per hundred parts by weight of the 1,3-cyclodiene and monovinylaromatic monomers
[2] Commercial divinylbenzene was used. This product was a mixture containing 26.2 percent divinylbenzene isomers with the remainder being ethylstyrene and diethylbenzene.

TABLE I

| Run No. | DVB[1] phm | n-BuLi mhm[2] | Conversion wt.% | $M_w \times 10^{-3}$ / $M_n \times 10^{-3}$ | HI[4] | IV[5] | 10 × Melt[6] Flow | Flexural Modulus [7] | Tensile Strength psi[8] | Elongation %[8] | Vicat Temp. °F.[9] | Gel Content %[5] |
|---|---|---|---|---|---|---|---|---|---|---|---|---|
| 1 | 0.0 | 3.8 | 94.6 | 48/33 | 1.45 | 0.40 | 3.33 | —[11] | —[11] | —[11] | 232 | 0 |
| 2 | 0.22 | 3.8 | 97.5 | 98/53 | 1.83 | 0.47 | 0.11 | 379 | 1780 | 2 | 220 | 0 |
| 3 | 0.34 | 3.8 | 97.5 | 208/75 | 2.8 | 0.56 | no go[10] | 370 | 2470 | 3 | 234 | 0 |
| 4 | 0.44 | 3.8 | 96.5 | 384/96 | 4.0 | 0.65 | no go | 369 | 2030 | 2 | 232 | 0 |
| 5 | 0.54 | 3.8 | 98.0 | 1,873/170 | 11.0 | 0.98 | 0.07 | 342 | 4430 | 4 | —[12] | 0 |
| 6 | 0.44 | 4.4 | 98.2 | 311/86 | 3.6 | 0.56 | no go | 367 | 1960 | 2 | 239 | 0 |

TABLE I-continued

| Run No. | DVB[1] phm | n-BuLi mhm[2] | Conversion wt.% | $M_w \times 10^{-3}$ $M_n \times 10^{-3}$ | HI[4] | IV[5] | 10 × Melt[6] Flow | Flexural Modulus[7] | Tensile Strength psi[8] | Elongation %[8] | Vicat Temp. °F.[9] | Gel Content %[5] |
|---|---|---|---|---|---|---|---|---|---|---|---|---|
| 7 | 0.54 | 4.4 | 98.4 | 593/117 | 5.1 | 0.65 | no go | 373 | 1980 | 2 | 231 | 0 |

[1]Amounts shown are actual divinylbenzene derived from the appropriate amount of the mixture described above
[2]mhm: gram millimoles per hundred grams monomer (monomer being the sum of 1,3-cyclohexadiene and styrene)
[3]$M_n$ and $M_w$: number average molecular weight and weight average molecular weight, respectively, each determined by gel permeation chromatography in accordance with G. Kraus and C. J. Stacy, J. Poly. Sci. A-2, 10, 657 (1972)
[4]Heterogeneity index: the quotient of the weight average molecular weight divided by the number average molecular weight
[5]IV: Inherent viscosity was determined in tetrahydrofuran by the process shown in U.S. Pat. No. 3,278,508 col. 20, note a with the modification that the solution was not filtered through a sulfur absorption tube but rather a sample of the solution was filtered through a fritted glass filter stick of grade C porosity and pressured directly into the viscometer. The gel content was determined in tetrahydrofuran in accordance with note b of the same patent
[6]Melt flow: g./10 min.at 200° C/5 Kg determined in accordance with ASTM D 1238
[7]ASTM D 790-63
[8]Tensile strength and percent elongation values were determined in accordance with ASTM D 412-66
[9]ASTM D 1525-58T
[10]No go = no flow occurred under these conditions
[11]Sample broke during preparation
[12]Value not determined Run 1 was a noninventive or control run. The high melt flow and the mechanical weakness of the resulting polymer was readily evident from the results for melt flow, flexural modulus, tensile strength, and elongation. Runs 1–5 inclusive indicated that the progressive inclusion of greater amounts of divinylbenzene produced a truly dramatic increase in molecular weight, which was indicative of branching as opposed to coupling. This dramatic increase in molecular weight occurred at a constant initiator level and at an essentially constant conversion. Coupling, i.e. formation of a dichain type polymer, could, at most, double the molecular weight, since a monolithium initiator was used. However, examining the number average molecular weight data, it was seen that the number average molecular weight went up by a factor of approximately 5:1. Clearly, branching must have occurred whereby several chains became connected to make a soluble, noncrosslinked, branched polymer molecule. The fact that no gel was detected in the copolymers of the invention, Runs 2 to 7, inclusive, as indicated by the complete solubility of the copolymers in tetrahydrofuran establishes that these copolymers contained no cured, crosslinked, or vulcanized material.

Runs 8 to 12

A series of runs, made in accordance with the following recipe, employed varing amounts of divinylbenzene and organolithium initiator and a polymerization temperature of 30° C. for 16 hours. The polymers were evaluated with the results appearing below in Table II.

| Charge Order | Recipe Compound | phm[a] | mhm[b] |
|---|---|---|---|
| 1 | Cyclohexane | 546 | — |
| 2 | Styrene | 60 | — |
| 3 | 1,3-Cyclohexadiene | 40 | — |
| 4 | Tetrahydrofuran | 0.8 | — |
| 5 | Divinylbenzene (DVB)[c] | variable | — |
| 6 | n-Butyllithium (1.66 molar in cyclohexane) | — | variable |
| Polymerization temperature, °C. | | | 30 |
| Polymerization time, hrs. | | | 16 |

[a]Parts by weight per hundred parts of monomer
[b]Gram millimoles per hundred grams of monomer
[c]Commercial divinylbenzene was used. This product was a mixture containing 26.2 percent divinylbenzene isomers with the remainder being ethylstyrene and diethylbenzene.

TABLE II

| Run No. | n-BuLi mhm | DVB phm | Conversion wt. % | 10 × Melt Flow at 200° C.[a] | Flexural Modulus psi × $10^{-3}$[b] | Tensile Break psi[c] | Elongation %[c] | Vicat Temp. °C.[d] |
|---|---|---|---|---|---|---|---|---|
| 8 | 3.8 | 0.5 | 95.0 | 1.00 | 381 | 1730 | 1 | 115 |
| 9 | 3.8 | 0.6 | 100.0 | 0.29 | 387 | 3160 | 2 | 100 |
| 10 | 4.4 | 0.5 | 98.0 | 0.57 | 369 | 1790 | 1 | 113 |
| 11 | 4.4 | 0.6 | 97.2 | 0.40 | 374 | 2120 | 1 | 112 |
| 12 | 4.4 | 0.7 | 100.0 | 0.09 | 384 | 3360 | 2 | 114 |

[a]Melt flow: g/10 min. at 200° C./21.6 Kg weight determined in accordance with ASTM D 1238
[b]ASTM D 790-63
[c]ASTM D 412-66
[d]ASTM D 1525-58T The properties of the polymers in Runs 8 and 12 are compared with comparable hydrogenated polymers in Table IV hereinafter.

Runs 13–17

Five additional polymerization runs were made following the procedure used for the previous runs and in accordance with the recipe below. Two of the polymers thus produced were then hydrogenated. The difference in polymerization time, 3 hrs. in Runs 13–17 versus 16 hrs. in Runs 8–12, is not viewed as precluding a comparison between the properties of the hydrogenated polymers of Runs 13–17 and the properties of the corresponding unhydrogenated polymers of Runs 8–12.

| Charge Order | Recipe Compound | phm | mhm |
|---|---|---|---|
| 1 | Cyclohexane | 546 | — |
| 2 | Styrene | 60 | — |
| 3 | 1,3-Cyclohexadiene | 40 | — |

-continued

| Charge Order | Compound | phm | mhm |
|---|---|---|---|
| 4 | Tetrahydrofuran | 0.8 | — |
| 5 | Divinylbenzene | variable | — |
| 6 | n-Butyllithium (1.66 molar in cyclohexane) | — | variable |
| Polymerization temperature, °C. | | | 30 |
| Polymerization time, hrs. | | | 3 |

The polymers from the first and the last runs, Runs 13 and 17 specifically, were hydrogenated. Table III below supplies polymerization specifications for n-butyllithium and divinylbenzene in reference to the above recipe and also indicates property values determined for the two hydrogenated polymers. Said hydrogenations were carried out on the polymers in toluene solution, at 70° C., at approximately 90 psig hydrogen, for approximately 6.5 hrs. and employing as a catalyst 5 mhm (gram millimoles per hundred grams of monomer) of nickel, charged as 5 mhm nickel octoate in the presence of 10 mhm triethylaluminum. The polymer solutions, after hydrogenation were mixed with water to destroy triethylaluminum and were aerated to oxidize the nickel. They were then treated with a mixture of phosphoric acid and ammonium hydrogen phosphate to form the respective metal phosphates. In each case the organic phase was then combined with isopropyl alcohol to coagulate the polymer, the polymers were collected by filtration and solvent traces were removed by heating the polymer at 100° C. and under reduced pressure. The polymer additives tris(nonylphenyl)phosphite, 1.5 parts, and 2,6-di-t-butyl-4-methylphenol, 0.5 parts, were mixed into the polymers at 150° C. on a roll mill.

TABLE III

| | Polymerization | | | Properties, Hydrogenated Polymers | | | | |
|---|---|---|---|---|---|---|---|---|
| Run No. | n-BuLi mhm | DVB phm | Conversion wt. % | 10 × Melt Flow at 200° C. | Flexural Modulus psi × 10⁻³ | Tensile Break psi | Elongation % | Vicat Temp., °C. |
| 13 | 3.8 | 0.5 | 90 | 0.04 | 387 | 3150 | 2 | 119 |
| 14 | 3.8 | 0.6 | 99.8 | —$^a$ | — | — | — | — |
| 15 | 4.4 | 0.5 | 91.8 | — | — | — | — | — |
| 16 | 4.4 | 0.6 | 93.2 | — | — | — | — | — |
| 17 | 4.4 | 0.7 | 92.0 | 0.03 | 386 | 1750 | 1 | 120 |

$^a$Dash denotes value not determined

Table IV, below, displays a contrast by pairing some runs from Table II (unhydrogenated) with comparable runs from Table III (hydrogenated).

TABLE IV

| Run No. | n-BuLi mhm | DVB phm | Conversion wt % | 10 × Melt Flow at 200° C. | Flexural Modulus psi × 10⁻³ | Tensile Break psi | Elongation % | Vicat Temp., °C. |
|---|---|---|---|---|---|---|---|---|
| 8 | 3.8 | 0.5 | 95.0 | 1.00 | 381 | 1730 | 1 | 115 |
| 13 | 3.8 | 0.5 | 90 | 0.04 | 387 | 3150 | 2 | 119 |
| 12 | 4.4 | 0.7 | 100.0 | 0.09 | 384 | 3360 | 2 | 114 |
| 17 | 4.4 | 0.7 | 92.0 | 0.03 | 386 | 1750 | 1 | 120 |

The definite improvement, i.e., increase, in Vicat softening temperature values for the hydrogenated polymers over their respective nonhydrogenated counterparts (Run 13 vs. Run 8, Run 17 vs. Run 12), as shown in Table IV, indicates articles fabricated from the hydrogenated polymers will have substantially upwardly extended range of service temperature. All the polymers reported in Runs 8-17 were resinous.

Runs 18-25

Styrene/1,3-butadiene/1,3-cyclohexadiene copolymers were synthesized following the procedure used for the previous runs but in accordance with the following recipe. Polymerization data with reference to the recipe and evaluation data obtained on the polymers are shown below in Table V.

| Charge Order | Compound | phm | mhm |
|---|---|---|---|
| 1 | Cyclohexane | 780 | |
| 2 | Styrene | 50 | |
| 3 | 1,3-Cyclohexadiene | 40 | |
| 4 | 1,3-Butadiene | 10 | |
| 5 | Tetrahydrofuran | 0.8 | |
| 6 | Divinylbenzene | variable | |
| 7 | n-Butyllithium | | 4.4 |
| Polymerization temperature, °C. | | | 30 |
| Polymerization time, hrs. | | | 16 |

TABLE V

| | Polymerization | | Polymer Evaluation | | | | |
|---|---|---|---|---|---|---|---|
| Run No. | Divinylbenzene phm | Conversion wt. % | $M_w \times 10^{-3}$ $^{(a)}$ | $M_n \times 10^{-3}$ $^{(a)}$ | HI$^{(b)}$ | I.V.$^{(c)}$ | Gel wt.%$^{(d)}$ |
| 18 | 0 | 93.3 | 44 | 33 | 1.32 | 0.41 | 0 |
| 19 | 0.1 | 87.3 | 50 | 37 | 1.36 | 0.45 | 0 |
| 20 | 0.2 | 91.3 | 56 | 39 | 1.45 | 0.44 | 0 |
| 21 | 0.3 | 93.3 | 67 | 46 | 1.46 | 0.47 | 0 |
| 22 | 0.4 | 91.3 | 77 | 45 | 1.70 | 0.50 | 0 |
| 23 | 0.5 | 93.3 | 107 | 53 | 2.0 | 0.52 | 0 |
| 24 | 0.6 | 93.3 | 140 | 69 | 2.0 | 0.55 | 0 |
| 25 | 0.7 | 96.0 | 204 | 82 | 2.5 | 0.60 | 0 |

$^{(a)}M_w$, weight average molecular weight; $M_n$, number average molecular weight; both determined based on gel permeation chromatography in accordance with G. Kraus and C. J. Stacy A-2 10, 657 (1972).

$^{(b)}$Heterogeneity index, $M_w/M_n$.

$^{(c)}$Inherent viscosity determined in accordance with U.S. Pat. No. 3,278,508, column 20, note a with the modification that tetrahydrofuran was employed in place of toluene and with the further modification that the solution was not filtered through a sulfur absorption tube but was filtered through a fritted glass filter stick of Grade C porosity and pressured directly into the viscometer.

$^{(d)}$The gel content of the polymer was determined in weight percent in accordance with U.S. Pat. No. 3,278,508, column 20, note b with the modification that tetrahydrofuran was employed in place of toluene.

The copolymers of Runs 19-25 having a range of divinylbenzene present in the polymerization reaction of from 0.1 to 0.7 phm in accordance with the invention were all gel free indicating the absence of curing, crosslinking or vulcanizing.

The polymers from Runs 24 and 25 were combined and hydrogenated under the procedure and conditons given for Runs 13 and 17 except that hydrogenation time was 5 hrs. Properties determined for the hydrogenated polymer were as follows: the 10×melt flow at 200° C. was 0.08; the flexural modulus×$10^{-3}$ was 335; the tensile break was 6260 psi; and the percent elongation was 5.

What is claimed is:

1. A method for the production of a 1,3-cyclodiene monovinylaromatic thermoplastic copolymer having essentially a zero percent gel content comprises the steps of:

polymerizing a 1,3-cyclodiene represented by the general formula

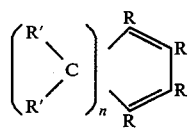

wherein n is an integer from 1 to 2, each R is selected from the group consisting of hydrogen, methyl and ethyl radicals, each R' is selected from the group consisting of hydrogen, linear or branched alkyl, cycloalkyl and aryl radicals such that the maximum number of carbon atoms per R' is about 6 and the total number of carbon atoms in the 1,3-cyclodiene is in the range of from about 5 to 20;

a monovinylaromatic compound wherein the total number of carbon atoms per molecule is in the range of from about 8 to 14; and a polyvinylaromatic compound represented by the general formulas selected from the group consisting of

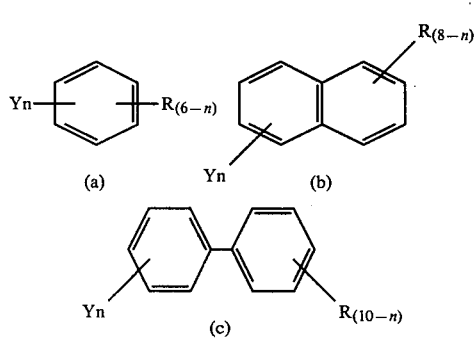

wherein Y is a vinyl radical, each R is selected from the group consisting of hydrogen and lower alkyls with the total of said R groups containing up to 12 carbon atoms and n is an integer of 2 to 3;

wherein said polymerization is carried out in the presence of an organolithium initiator represented by the general formula $RLi_x$ wherein x is an integer from 1 to 4, R is a hydrocarbon radical selected from the group consisting of aliphatic, cycloaliphatic and aromatic radicals and the valence of R is equal to the integer x; and wherein the amount of polyvinylaromatic hydrocarbon incorporated in the copolymer is in the range of from about 0.02 to 2 parts by weight per hundred parts by weight monomer.

2. The method of claim 1 wherein said polymerization is carried out at a temperature in the range of from about 0° to 300° F.

3. The method of claim 2 wherein said temperature is in the range of from about 30° to 150° F.

4. The method of claim 3 wherein said polymerization is carried out in the presence of a hydrocarbon diluent which is not detrimental to the polymerization.

5. The method of claim 4 wherein said hydrocarbon diluent is a cycloparaffin.

6. The method of claim 5 wherein said polymerization is carried out in the presence of an ether selected from the group consisting of tetrahydrofuran, dioxane, dimethyl ether, diethyl ether, di-n-butyl ether, ethyl n-butyl ether, anisole and diphenyl ether, and the amount of ether is in the range of from about 0.01 to 50 parts by weight per hundred parts monomer.

7. The method of claim 6 wherein the amount of ether is in the range of from about 1 to 10 parts by weight per 100 parts monomer.

8. The method of claim 7 wherein the weight ratio of the 1,3-cyclodiene units to units of the monovinylaromatic compound in the copolymer is in the range of from about 1:99 to 99:1, the amount of polyvinylaromatic hydrocarbon incorporated in the copolymer is in the range of from about 0.05 to 1 parts by weight per hundred parts by weight monomer, and the amount of organolithium initiator is in the range of from about 0.1 to 100 millimoles per hundred grams of monomer.

9. The method of claim 8 wherein the 1,3-cyclodiene is 1,3-cyclohexadiene, the monovinylaromatic compound is styrene, the polyvinylaromatic hydrocarbon is divinylbenzene, the organolithium initiator is n-butyllithium, the polymerization is carried out in the presence of a cyclohexane diluent, and the weight ratio of 1,3-cyclohexadiene units to styrene units in the copolymer is in the range of from about 20:80 to 80:20.

10. The method of claim 1 wherein the copolymers produced by said polymerization are passed to a hydrogenation zone wherein a portion of the olefinic unsaturation of said copolymer is hydrogenated in the presence of a suitable catalyst.

11. The method of claim 10 wherein at least 65 percent of the olefinic unsaturation of said copolymer is hydrogenated.

12. The method of claim 10 wherein essentially all of the olefinic unsaturation is hydrogenated and at least a portion of the aromatic unsaturation is hydrogenated.

13. The method of claim 10 wherein at least 80 percent of the aromatic unsaturation is hydrogenated.

14. A thermoplastic copolymer comprising:

units of a 1,3-cyclodiene represented by the general formula

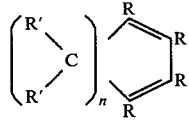

wherein n is an integer from 1 to 2, each R is selected from the group consisting of hydrogen, methyl and ethyl radicals, each R' is selected from the group consisting of hydrogen, linear or branched alkyl, cycloalkyl and aryl radicals such that the maximum number of carbon atoms per R' is about 6 and the total number of carbon atoms per 1,3-cyclodiene molecule is in the range of from about 5 to 20;

units of a monovinylaromatic compound wherein the total number of carbon atoms per unit is in the range of from about 8 to 14; and units of a polyvinylaromatic hydrocarbon represented by the general formulas selected from the group consisting of

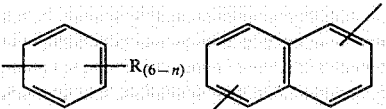 

(a)  (b)

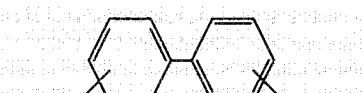

(c)

wherein Y is a vinyl radical, each R is selected from the group consisting of hydrogen and lower alkyls with the total of said R groups containing up to 12 carbon atoms and n is an integer of 2 to 3; wherein the amount of polyvinylaromatic hydrocarbon incorporated in the copolymer is in the range of from about 0.02 to 2 parts by weight per hundred parts by weight monomer.

15. The copolymer of claim 14 wherein the weight ratio of 1,3-cyclodiene units to monovinylaromatic compound units in the copolymer is in the range of from about 1:99 to 99:1, and the amount of the polyvinylaromatic hydrocarbon units is in the range of from about 0.05 to 1.0 parts by weight per hundred parts by weight monomer.

16. The copolymer of claim 14 wherein the 1,3-cyclodiene is cyclohexadiene, the monovinylaromatic compound is styrene, the polyvinylaromatic hydrocarbon is divinylbenzene, and the weight ratio of 1,3-cyclohexadiene units to styrene units in the copolymer is in the range of from about 20:80 to 80:20.

17. The copolymer of claim 14 wherein a portion of the olefinic unsaturation is hydrogenated.

18. The copolymer of claim 14 wherein at least 65 percent of the olefinic unsaturation is hydrogenated.

19. The copolymer of claim 14 wherein essentially all of the olefinic unsaturation is hydrogenated and at least a portion of the aromatic unsaturation is hydrogenated.

20. The copolymer of claim 14 wherein at least 80 percent of the aromatic unsaturation is hydrogenated.

* * * * *